Figure 1:
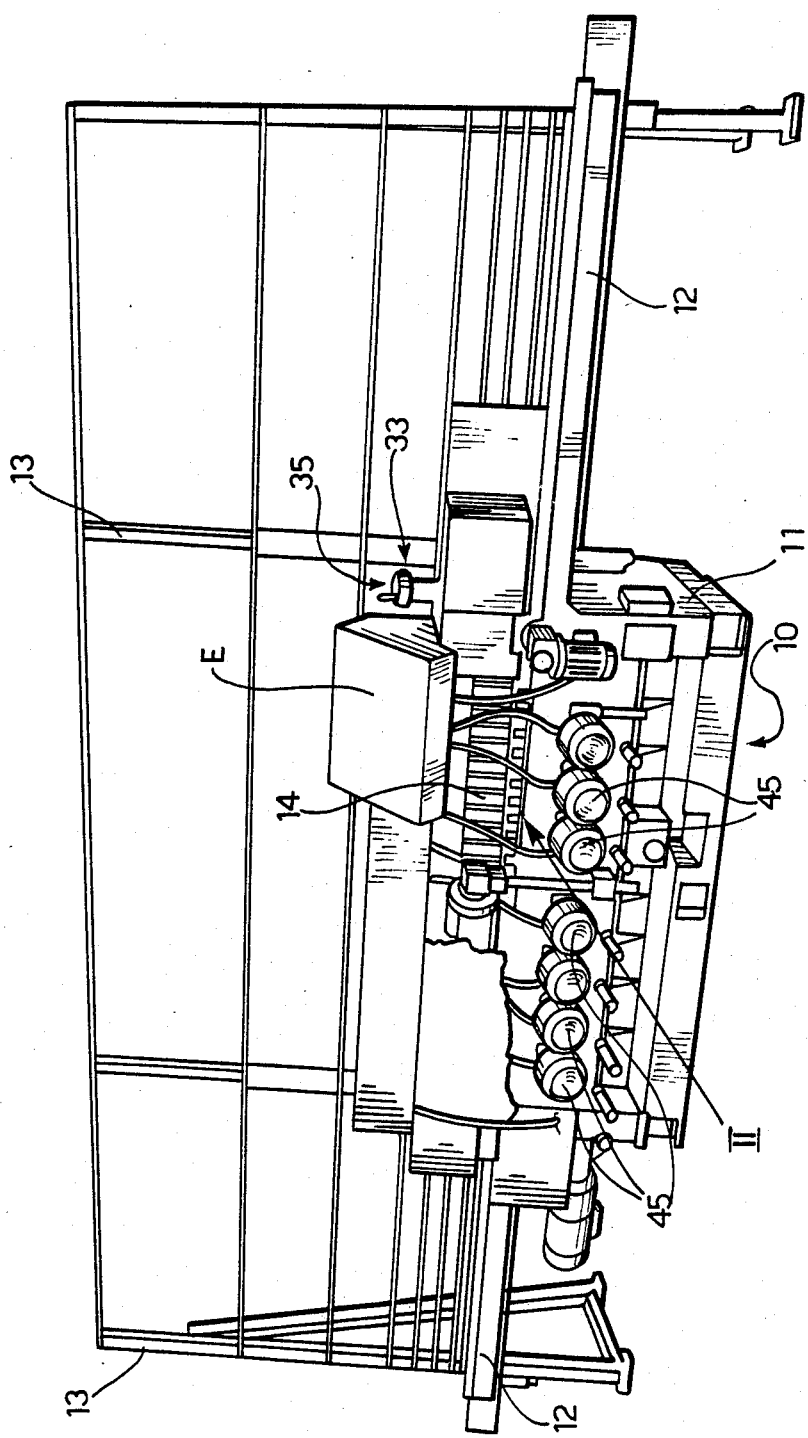

United States Patent [19]

Cevrero et al.

[11] Patent Number: 4,908,992
[45] Date of Patent: Mar. 20, 1990

[54] CHAMFERING MACHINE, PARTICULARLY FOR SHEETS OF GLASS

[75] Inventors: Sergio Cevrero; Claudio Gariglio, both of Turin, Italy

[73] Assignee: A.D.A. S.a.s. di Gariglio Claudio & C., Turin, Italy

[21] Appl. No.: 219,547

[22] Filed: Jul. 15, 1988

[30] Foreign Application Priority Data

Jul. 15, 1987 [IT] Italy .............................. 67611 A/87

[51] Int. Cl.[4] .............................................. B24B 9/10
[52] U.S. Cl. .................................... 51/110; 51/283 E; 51/128; 198/628
[58] Field of Search ...................... 51/110, 128, 283 E; 198/627, 628

[56] References Cited

U.S. PATENT DOCUMENTS 4,493,167  1/1985  Bavone .................................. 51/110
4,660,327  4/1987  Bando .................................... 51/110

FOREIGN PATENT DOCUMENTS 1192693  3/1968  United Kingdom ................ 198/131

Primary Examiner—Frederick R. Schmidt
Assistant Examiner—Jack W. Lavinder
Attorney, Agent, or Firm—Sughrue, Mion, Zinn, Macpeak & Seas

[57] ABSTRACT

A chamfering machine for sheets of glass and the like includes a pair of tracks with vertical axes for conveying the sheets, in which the shoes of one track are provided with elements which can slide transverse the direction of advance of the tracks under the action of control cams, in order to prepare the machine for the chamfering of sheets of reduced width without any operation to adjust the relative positions of the tracks.

6 Claims, 5 Drawing Sheets

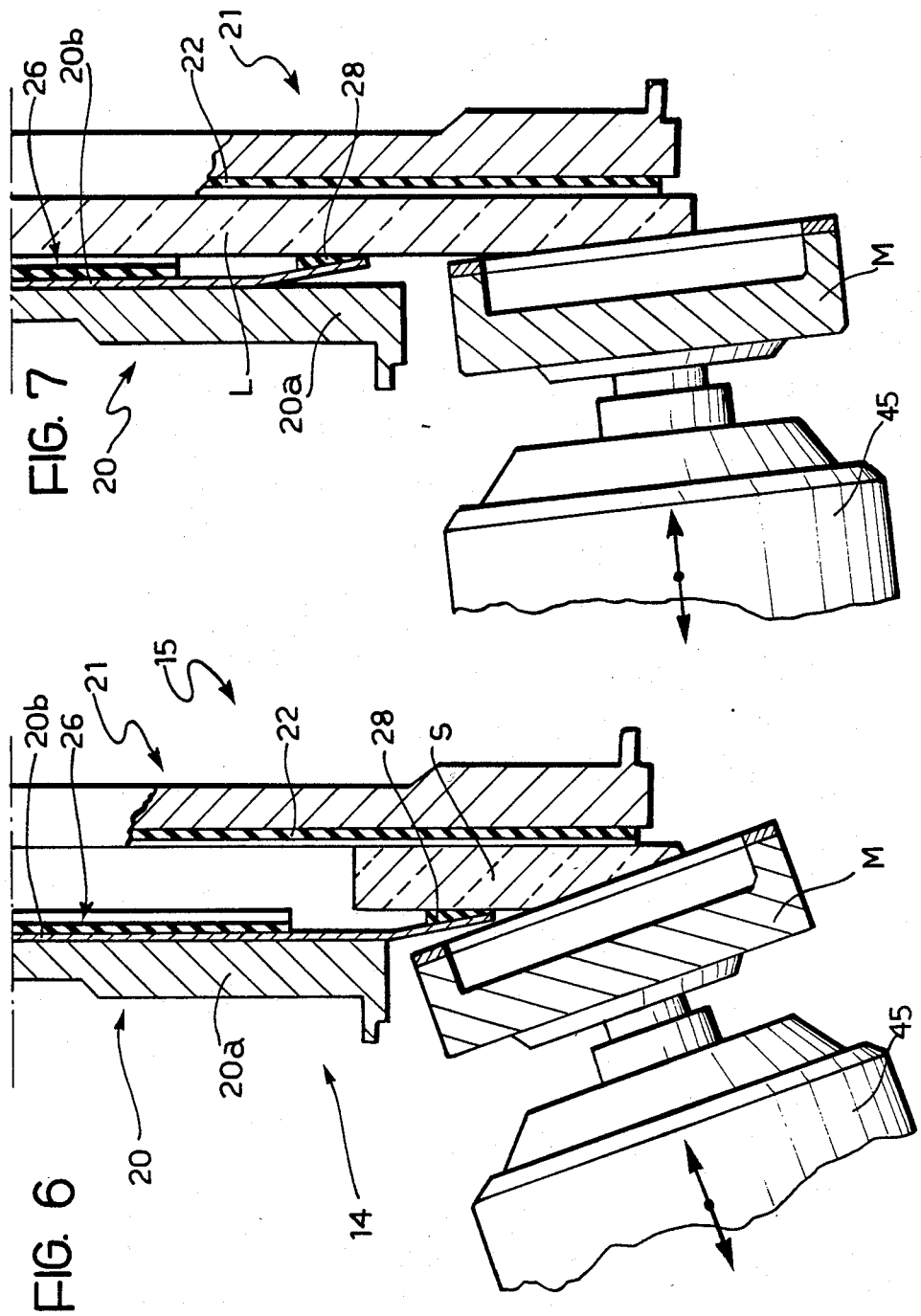

CHAMFERING MACHINE, PARTICULARLY FOR SHEETS OF GLASS

The present invention relates to a chamfering machine, particularly for sheets of glass, including a support structure, a pair of facing conveyor tracks supported by the structure for gripping the sheets between them and causing the advance thereof, and a plurality of abrasive tools situated substantially beside the tracks.

In chamfering machines of the above type, when sheets of glass of reduced width are to be chamfered, it is necessary to provide for the manual adjustment of the relative positions of the tracks in order to enable the sheet to be gripped correctly in correspondence with its surface which faces the abrasive tool. In fact, the dimensions of these tools (normally cup or disc grinding wheels) and their inclined positions relative to the sheet make it necessary to displace one of the tracks parallel to itself in order to enable the sheet to be gripped This adjustment is laborious and requires subsequent setting up of the machine with a further loss of time Moreover, it is not often possible to chamfer strips of less than a certain width with the movement of one of the tracks.

The object of the present invention is to provide a chamfering machine of the type specified at the beginning of the description, which does not have the above problems, which permits automated operation, and which is simple and cheap to produce.

According to the invention, this object is achieved by virtue of the fact that at least one of the tracks has shoes including sheet-support elements which can slide substantially transverse the direction of advance of the tracks, under the action of control means, between a retracted position and an extended position.

By virtue of these characteristics, it is possible to prepare the machine for the treatment of sheets of reduced width or strips simply by the operation of a single manual or motor-driven control which causes the slidable elements for supporting the sheets to move into positions such as to enable the correct gripping of the sheet in the proximity of the edge region which is subjected to chamfering. Moreover, the movement of the slidable elements may be adjusted in dependence on the width of the sheets to be chamfered. A further advantage concerns the elimination of the setting-up of the machine after it has been prepared for the treatment of sheets of reduced width.

Figure 2:
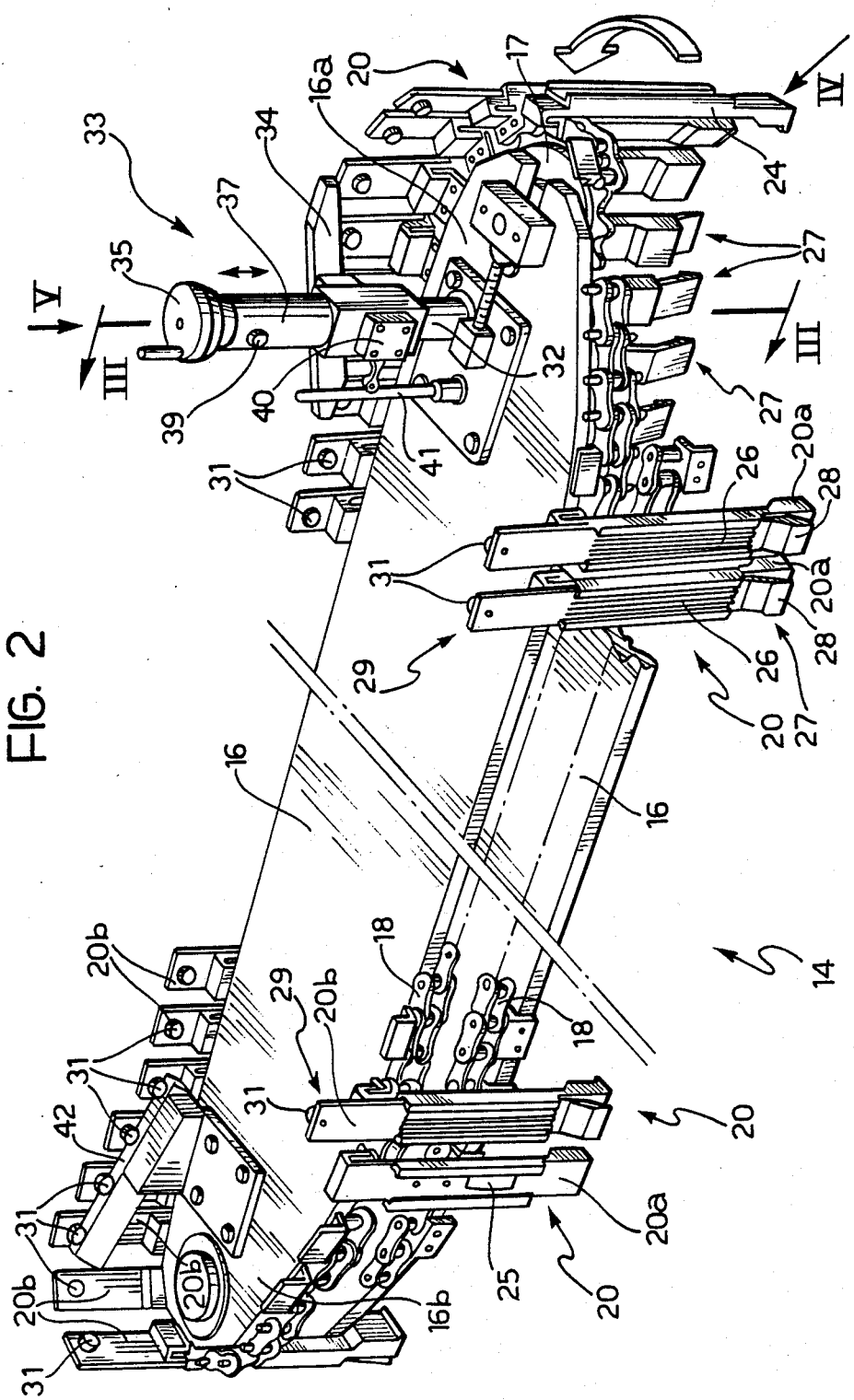
Figure 3:
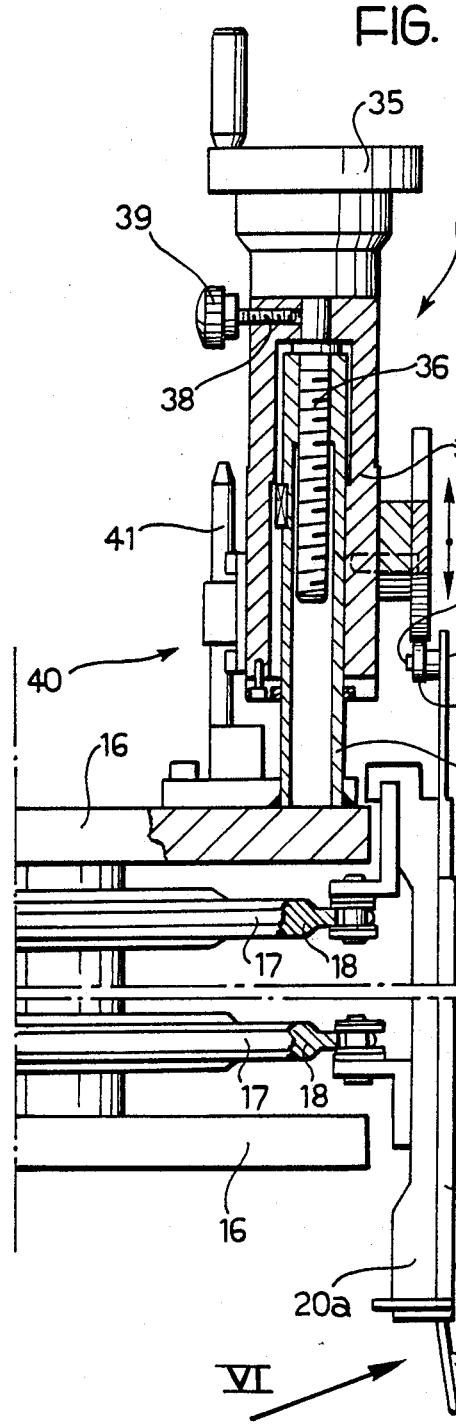
Figure 4:
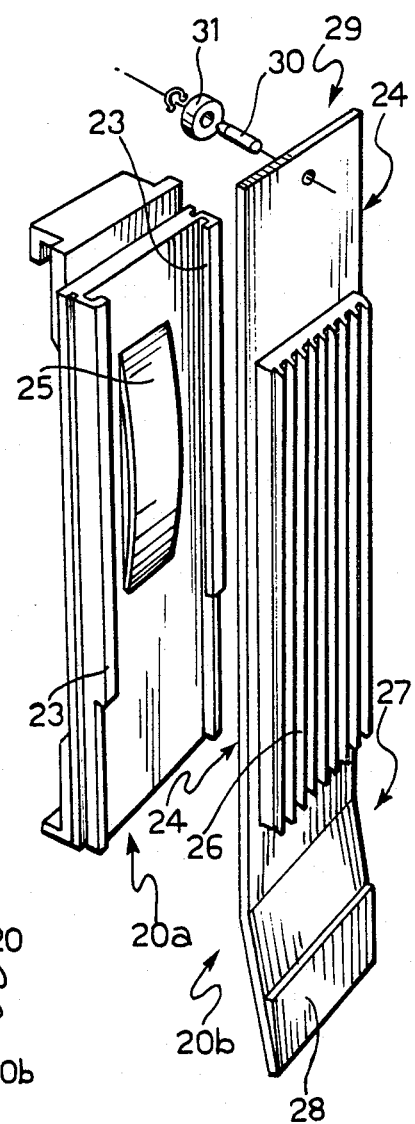
Figure 5:
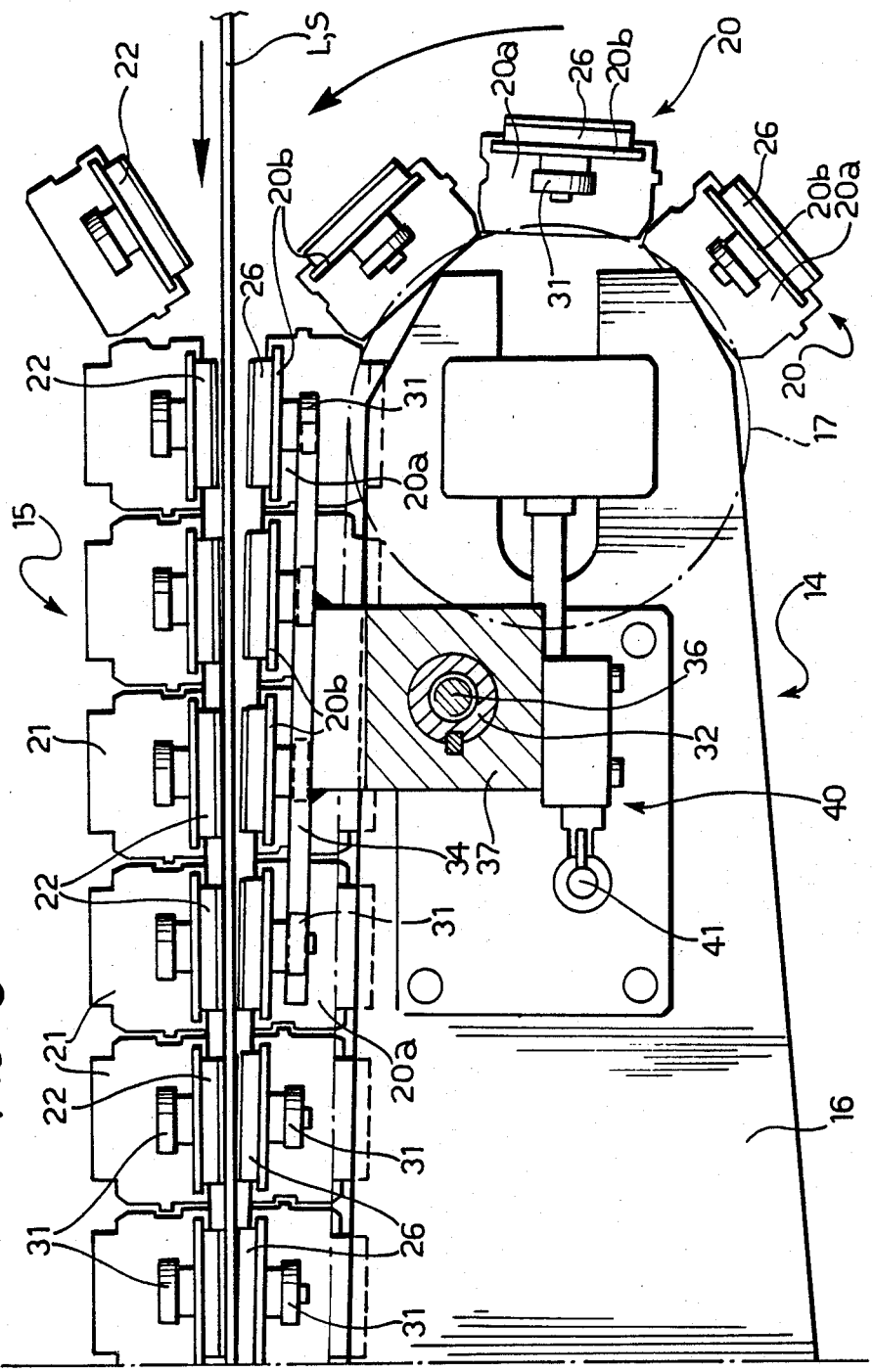

Further characteristics and advantages of the chamfering machine according to the invention will become clear from the detailed description which follows, by way of non-limiting example, with reference to the appended drawings, in which:

FIG. 1 is a partially-sectioned perspective view of a chamfering machine according to the invention, FIG. 2 is a perspective view of a detail of FIG. 1, FIG. 3 is a section taken on the line III—III of FIG. 2, FIG. 4 is an exploded perspective view of a detail of FIG. 2, FIG. 5 is a view taken on the arrow V of FIG. 2, FIG. 6 is a schematic cross-section of the machine in a first operative configuration, and FIG. 7 is a view similar to FIG. 6 and shows the machine in a second operative configuration.

With reference to the drawings, a chamfering machine, indicated 10, comprises a support structure 11, an electrical control panel E, a horizontal guide 12 for the vertical sheets, and a frame 13 for supporting the sheets. The machine 10 has a central pair of motor-driven tracks, 14 and 15 respectively, which have vertical axes and face each other so as to be able to grip the sheets and enable their advance, in known manner.

The front track 14 includes a frame provided with a pair of facing, elongate plates 16 for supporting, at their ends, support pins for a pair of drive wheels (not illustrated) and a pair of track-tensioning wheels 17, around which a pair of chains 18 pass in a loop. Shoes 20 are connected to the latter and are each provided with a support element 20a and a transversely slidable element 20b which will both be described in more detail below. The front track 14 may be moved parallel to itself in known manner, in dependence on the thickness of the sheets to be chamfered.

The rear track 15 has an essentially similar structure to that of the front track 14, with sheet-support shoes 21 having a flat covering 22 of elastomeric material in order to ensure sufficient friction with the sheets.

Below the tracks 14 and 15, the structure 11 of the machine 10 supports a plurality of rotary tools M constituted by abrasive cup or disc grinding wheels and by polishing wheels The tools M are rotated by electric motors 45 whose positions can be adjusted both as regards the inclination of their axes of rotation (on which the chamfering angle depends) and as regards the movement of the motors on their axes (to compensate for the wear of the tools).

The support elements 20a of the shoes 20 of the front track 14 have lateral guide channels 23 complementary to lateral edges 24 of the slidable elements 20b. Moreover, each support element 20a has a central, curved resilient plate 25 for cooperating with the respective slidable element 20b in order to keep it in position in the guides 23 by friction. Each slidable element 20b also has a ribbed covering 26 of elastomeric material on its central portion and a flat covering 28, also of elastomeric material, at a lower end 27 formed like a flexible resilient plate. The end of the slidable element 20b is bent slightly so that the covering 28 is in a slightly raised plane relative to the plane defined by the covering 26 associated with the central portion A pin 30 which rotatably supports a wheel 31 is fixed to the slidable element 20b at its upper end 29.

The upper plate 16 of the front track 14 is provided at a first end 16a with a support column 32 to which an inclined plate-like cam 34 situated beside the front track 14 is fixed with the interposition of a control system 33. The adjustment system 33 comprises a male and female screw coupling (FIG. 3) controlled by an operating handwheel 35. The handwheel 35 rotates a central threaded pin 36 which cooperates with the internally-threaded support column 32 to enable the vertical sliding thereon of a tubular support element 37 to which the cam 34 is fixed laterally. A locking rod 38, also screwed laterally to the tubular support element 37, is operated by means of a knob 39 and cooperates with a non-threaded portion of the rod 36 in order to lock the tubular member 37 in position relative to the support column 32. A proximity sensor 40 is fixed laterally to the tubular element 37 on the opposite side to the cam 34 and cooperates with a vertical pin 41 to provide a signal indicative of the position of the tubular element 37 (and therefore of the cam 34) with respect to the upper plate 16.

At its second end 16b, the upper plate 16 has a fixed cam 42 in the shape of an inclined plate, also situated beside the front track 14.

When the chamfering machine 10 is to treat normal sheets L, for example of glass, the tubular element 37 is located in a raised position such that the cam 34 is above the wheels 31 associated with the upper ends 29 of the slidable elements 20b, so that the latter are in the retracted configuration, that is, with their ends 27 situated in correspondence with the lower ends of the support elements 20a (FIG. 7). It is clear that, in this configuration, the shoes 20 bear on the sheets L both in correspondence with the ribbed covering 26 and in correspondence with the flat covering 28 of the slidable element 20b.

When it is necessary to chamfer sheets or strips S of reduced width, the operator acts on the handwheel 35 to lower the cam 34 by a predetermined amount such as to enable its engagement with the wheels 31 associated with the ends 29 of the slidable elements 20b for the consequent downward sliding of the latter. The lower resilient ends 27 of the slidable elements 20b are thus positioned in the space between the cup grinding wheels M and the strip S, as indicated in FIG. 6, enabling correct gripping and correct advance. The sliding of the slidable elements 20b relative to the support elements 20 is carried out before the shoes 20 come into contact with the sheet or strip, as clearly shown in FIG. 5. The shape of the end 27 of the slidable element 20b is such that the resilient gripping pressure exerted on the strip is substantially the same as the resilient gripping pressure exerted on the sheets by the ribbed covering 26. Once they reach the fixed cam 42, the wheels 31 cause the slidable elements 20b to slide upwardly, back to their original position, so as not to cause any problems of interference either with the support structure of the chamfering machine 10 or with the motors 45 of the tools M, particularly with small chamfering angles The proximity sensor 40 may, to advantage, be connected to a luminous indicator for advising the operator of the operating mode of the machine (normal sheets or narrow sheets). Moreover, it is clear that the positions of the slidable elements 20b relative to the support elements 20a of the shoes 20 may be varied at will by means of the handwheel 35, in dependence on the different widths of the sheets, as well as in dependence on the required chamfering angle.

Naturally, it is understood that, the principle of the invention remaining the same, the forms of embodiment and details of construction may be varied widely with respect to those described and illustrated in the drawings, without thereby departing from the scope of the present invention.

For example, the movement of the cams 34 may be achieved, for example, by means of a geared motor unit operable by means of a switch on the control panel E, instead of by means of the manually-operated wheel 35.

We claim:

1. A chamfering machine, particularly but not exclusively for sheets of glass, including a support structure, a pair of opposed endless conveyor means support by the structure on opposite sides of a plane extending transversely between said conveyor means for gripping the sheets between them and causing the advance thereof in said plane, and a plurality of abrasive tools supported by said structure adjacent said conveyor means, wherein one of said conveyor means is provided with a plurality of individual shoes including sheet-support elements which are slidable substantially parallel to said plane between a retracted position and an extended position with control means being provided to effect the sliding of the sheet-support elements wherein each slidable sheet-support element has a float portion which is adapted to come into contact with the sheets and an end portion for cooperating with the control means and wherein the control means include first and second cams mounted on the support structure substantially adjacent said conveyor means and adapted to be engaged by each slidable element in sequence to move each slidable element from the retracted position to the extended position and vice versa, during the movement of the conveyor means.

2. A machine according to claim 1, wherein the first cam is provided with means for adjusting its position.

3. A machine according to claim 2, wherein the means for adjusting the position of the first cam comprise a male and female screw coupling.

4. A machine according to claim 1, wherein the shoes of said one of said conveyor means have support members provided with lateral guide channels in which the edges of the slidable sheet-support elements are intended to slide.

5. A machine according to claim 4, wherein resilient retaining means are interposed between the support members and the slidable sheet-support elements.

6. A machine according to claim 1, wherein wheels are rotatably mounted on the end portions of the slidable elements for cooperating with the cams.

* * * * *